United States Patent
Dalton et al.

[19]

[11] Patent Number: 5,928,746
[45] Date of Patent: Jul. 27, 1999

[54] METHOD AND APPARATUS FOR MANUFACTURING A CRACK REPAIR PRODUCT AND REPAIRING A CRACK USING THE PRODUCT

[75] Inventors: Peter F. Dalton, Madison, Conn.; John A. Dalton, Boston, Mass.

[73] Assignee: Dalton Enterprises, Inc., Cheshire, Conn.

[21] Appl. No.: 08/786,712

[22] Filed: Jan. 21, 1997

[51] Int. Cl.⁶ ........................................................ C09J 5/06
[52] U.S. Cl. ........................ 428/40.1; 428/41.3; 428/41.7; 428/41.8; 428/375; 428/377; 428/515; 428/516; 428/517
[58] Field of Search .................................. 428/41.5, 41.7, 428/41.8, 489, 490, 491, 37, 371, 373, 40.3, 40.5, 906, 40.1, 377, 41.3, 375, 516, 517, 515

[56] References Cited

U.S. PATENT DOCUMENTS

| | | | |
|---|---|---|---|
| 3,916,046 | 10/1975 | Youngberg | 428/31 |
| 4,068,023 | 1/1978 | Nielson et al. | 427/138 |
| 4,069,182 | 1/1978 | McDonald | 521/44.5 |
| 4,654,250 | 3/1987 | Black et al. | 428/195 |
| 4,822,655 | 4/1989 | Foster | 428/40 |

*Primary Examiner*—Paul Thibodeau
*Assistant Examiner*—D Lawrence Tarazano
*Attorney, Agent, or Firm*—McCormick, Paulding & Huber

[57] ABSTRACT

A method and apparatus for manufacturing a crack repair product, and a method of repairing a crack using the product are disclosed. The material is made by heating and softening a bulk sample of direct-fire crack sealer material. The softened material is then extruded into a strand having a predetermined diameter. An anti-adherent material such as a polyethylene film is then applied to the extruded material, and the material is drawn along its length to reduce the diameter of the material to a desired diameter. In order to repair a crack, a length of the material is selected and has a diameter corresponding to the crack width. The material is packed into and near the top of the crack, and is then melted to permanently seal and repair the crack.

17 Claims, 4 Drawing Sheets

METHOD AND APPARATUS FOR MANUFACTURING A CRACK REPAIR PRODUCT AND REPAIRING A CRACK USING THE PRODUCT

BACKGROUND OF THE INVENTION

The present invention relates generally to repairing cracks in asphalt or concrete surfaces, and more particularly to a method of making an extruded, direct fire crack filler material which is used to permanently repair the crack.

On a national basis, one of the most expensive investments is the system asphalt and concrete roadways. Given the expense of constructing these roadways, it is extremely important to maintain proper road conditions, both to protect the investment and permit people to travel safely and quickly.

On an individual basis, almost every home and business includes a finished traffic area, e.g., an asphalt or concrete driveway or parking lot, or even a basketball/tennis court. Apart from any buildings on the property, these areas typically represent one of the more expensive improvements on any property. Thus, it is also extremely important to properly maintain these areas to protect the investment.

Roadways, driveways, parking lots and other surfaces that are finished with asphalt and concrete crack and wear out over time, and such damage is caused by different variables. The number and size of vehicles, or lack of vehicles, traversing the surface affects the surface integrity, as a portion of the surface is compressed and then expands as each vehicle traverses that portion. Also, asphalt is very susceptible to the elements, e.g., sun, wind, rain and heat, which oxidize the asphalt. Oxidized asphalt hardens and shrinks, and breaks first at its weakest point.

The cracks and wear can be divided into several different types. A reflective crack forms when a cracked or worn surface is covered over with a new layer of surface material. Existing cracks in the underlying pavement simply reflect or migrate upwardly thorough the new layer of material. A joint crack is a result of an inherent part of the paving or concrete pouring process, since a joint is formed between segments of a surface each time a load of paving material is consumed and the next load is started. Joint cracking occurs if a proper bond does not form between the two loads of material. A slippage crack is typically the result of heavy traffic, and in the event that a proper bond is not formed between upper and lower layers of paving material, adjacent levels of material may slip or shear and crack. Thermal cracks result from temperature cycles, and the corresponding surface expansion and contraction of the pavement. Fatigue or alligator cracks occurs over time, as the surface material loses its ability to expand and contract. Since hardened material will not compress and expand vertically as vehicles pass over the material, the material cracks. Block cracks result from too little traffic, and cracks form due to the lack of vehicle weight on the material, which would otherwise compress the material. Edge cracks typically extend parallel to and within about 18 inches from the edge of finished surface, and can result from a poor subsurface, drainage or the effects of freezing-thawing water as described above.

If improperly repaired or left unmaintained, each crack enables the elements to more rapidly cause further and more expensive damage to surface and subsurface materials. Even small cracks in asphalt or concrete surfaces which are improperly repaired or left unmaintained rapidly result in extensive damage. For example, water will seep through cracks and into the subsurface materials, and freeze and thaw with temperature changes. When the water freezes and thaws, the surrounding areas expands, contracts and consolidates, and rapidly deteriorates. Thus, the small cracks, which could have been treated as a small repair job, quickly result in an expensive reconstruction project.

From the early days of asphalt and concrete surfaces, it became apparent that it was not economically feasible to simply repave a surface each time that cracks or wear appeared. A new industry arose and introduced crack fillers and crack sealers for maintaining structural integrity and obtain longer life span of the roadways, parking lots and other surfaces. As used herein, crack fillers are inserted into the cracks to reduce water intrusion and help reinforce the surrounding pavement. Crack sealers are placed above or just into the cracks in order to prevent the intrusion or water, sand, gravel and dirt into the crack. Accordingly, a properly sealed crack is preferable to crack filling for making longer-lasting repairs.

The integrity of each repair is only as good as the preparation of the crack to be repaired. A crack must be properly cleaned and prepared prior to repair. Preparation includes routing or widening narrow cracks to provide an adequate reservoir to receive sealant, wire brushing, hot or cold air blowing or sand blasting. Melted sealant is then poured into the cracks, and allowed to cool.

Over time and utilizing advances in materials and technology, the industry developed what is today considered the optimum crack repair material, a hot-poured, rubberized crack sealant which not only resists the elements, but also adheres to the sidewalls of cracks, and expands and contracts with temperature cycles. Hot-poured sealers also enable control over base and sub-base conditions, as well as pavement interference and crack growth.

Typical hot-poured sealants includes blends of asphalts, cements, extender oils, rubbers, anti-oxidants and fillers. Regardless of composition, these sealants are all hot-applied, e.g., heated to liquid form and then poured into a crack to be repaired. Once poured, the melted sealant bonds with the edges of the crack, and cools to form a proper seal with the side walls of the crack. As noted above, a properly sealed crack prevents water intrusion, as well as intrusion by loose materials such as sand and rocks.

Hot pour sealers are not easy to use, as such sealers require a measure of sophistication and knowledge of the intended use to select the proper sealant for the job. For example, the climate in which a sealant will be used greatly affects the type of sealant selected. In the Northeast, roadways are subjected to extreme temperature changes from season to season, and even from day to day. Asphalt and concrete roadway surfaces are frozen and thawed numerous times, and the repeated expansion and contraction causes substantial movement of the surface and any cracks and joints. In the South, roadways are also subject to temperature cycles, but the average temperature is much higher. In either case, the sealant must form and maintain a bond with the cracks, and also remain unaffected by the elements.

A crack repair business must make a substantial capital investment in equipment. Known equipment includes expensive melters, pumps and/or hand-operated pour-pots. A melter typically includes a "double-boiler" kettle in which large blocks, e.g., several 50 lb. blocks, of material are agitated and melted, and held for pouring. The melted material is then poured into a crack or joint, either directly from the kettle or from a hand-operated pour-pot. Unfortunately, melters are expensive, costing up to $10,000 or more.

While this arrangement provides economies of scale for the large-scale purchasers of the crack sealer material, it is impractical for the average homeowner or small business owner to purchase such equipment to maintain his or her own property. Thus, the business of installing the repair material, i.e., actually fixing cracks, remains with the manufacturers of the hot-pour materials, who provide the large blocks of material to municipalities, and to the contractors and businesses which perform the repairs using the expensive equipment described above.

As a result of the substantial expense associated with the use of hot pour crack sealers, homeowners and small businesses have basically had two alternatives for repairing cracks - retain the services of a business that has the equipment necessary to use hot pour sealer to repair the cracks, or use a cold-pour sealer and/or filler material. However, it is expensive to retain the services of a crack repair business to repair cracks, on the order of several hundreds of dollars for a mildly cracked driveway. On the other hand, the cold-pour materials do not consistently form permanent bonds with the sidewalls of the cracks nearly as well as hot-pour sealers. Consequently, repairs using cold-pour products are not permanent, and must be monitored repeatedly and repaired as necessary to prevent further cracking and expensive damage.

In addition, the hot-pour and cold-pour crack repair materials are applied as a liquid. While the drawbacks associated with hot-pour materials are discussed above, the cold pour materials have similar disadvantages. Since the cold pour materials are typically liquid or semi-liquid material, special equipment is necessary to handle the liquid material. Moreover, the cold-pour, liquid materials tend to drip or splatter during application to a crack, and thus create a sloppy appearance of the repaired crack, in addition to creating messy work equipment such as pour-pots and bottles, and where work gloves are not used - hands and clothing which are very difficult to clean. Moreover, the packaging and handling equipment for liquids must be disposed of, with associated environmental drawbacks.

It would be desirable to provide a crack sealer which overcomes the drawbacks and disadvantages of known crack repair products, while using direct fire crack sealer materials without the associated high expense.

SUMMARY OF THE INVENTION

In accordance with one aspect of the present invention, a method and apparatus are disclosed for making a direct-fired crack sealing product for repairing driveways, parking lots and the like. Bulk direct-fire crack sealing material is heated in a heating chamber to a first, temperature near the melting temperature of the material in order to soften the material. The softened material is extruded into a length of extruded material having a predetermined diameter. An anti-adherent covering is applied to the exterior surface of the extruded material. Another aspect of the present invention relates making a crack sealing product in accordance with the method.

In accordance with a further aspect of the invention, a method is disclosed for repairing a crack having a length and width in driveways, parking lots and the like. The method includes the steps of: selecting a length and diameter of extruded, direct-fire crack sealing material, the length and diameter of the crack sealing material corresponding generally to the length and width of the crack; inserting the length of material directly into the crack to be repaired; and melting and liquefying the crack sealing material positioned in the crack, thereby fusing the material to the edges of the crack to permanently repair the crack.

The present invention provides significant advantages of known methods and apparatus for making crack repair materials, and method of repairing cracks using the materials.

One advantage of the present invention is crack repairs may be made using an optimum crack sealer, namely hot-pour, rubberized crack sealer, without the substantial capital investment associated with prior hot-pour crack repair methods.

Another advantage of the present invention is that a hot-pour crack sealer may be applied by the homeowner or other "do-it-yourselfer" using inexpensive tools which are readily available in most households and small businesses, thereby eliminating the need and expense associated with hiring a contractor.

Still another advantage of the present advantage is that an anti-adherent cover is applied to the crack sealer material, thereby eliminating the mess associated with known crack sealer and filler materials.

Yet a further advantage is that the present invention uses only as much crack sealer as is needed to seal the existing cracks, so that no material is wasted.

DETAILED DESCRIPTION OF THE PREFERRED EMBODIMENTS

Figure 1:
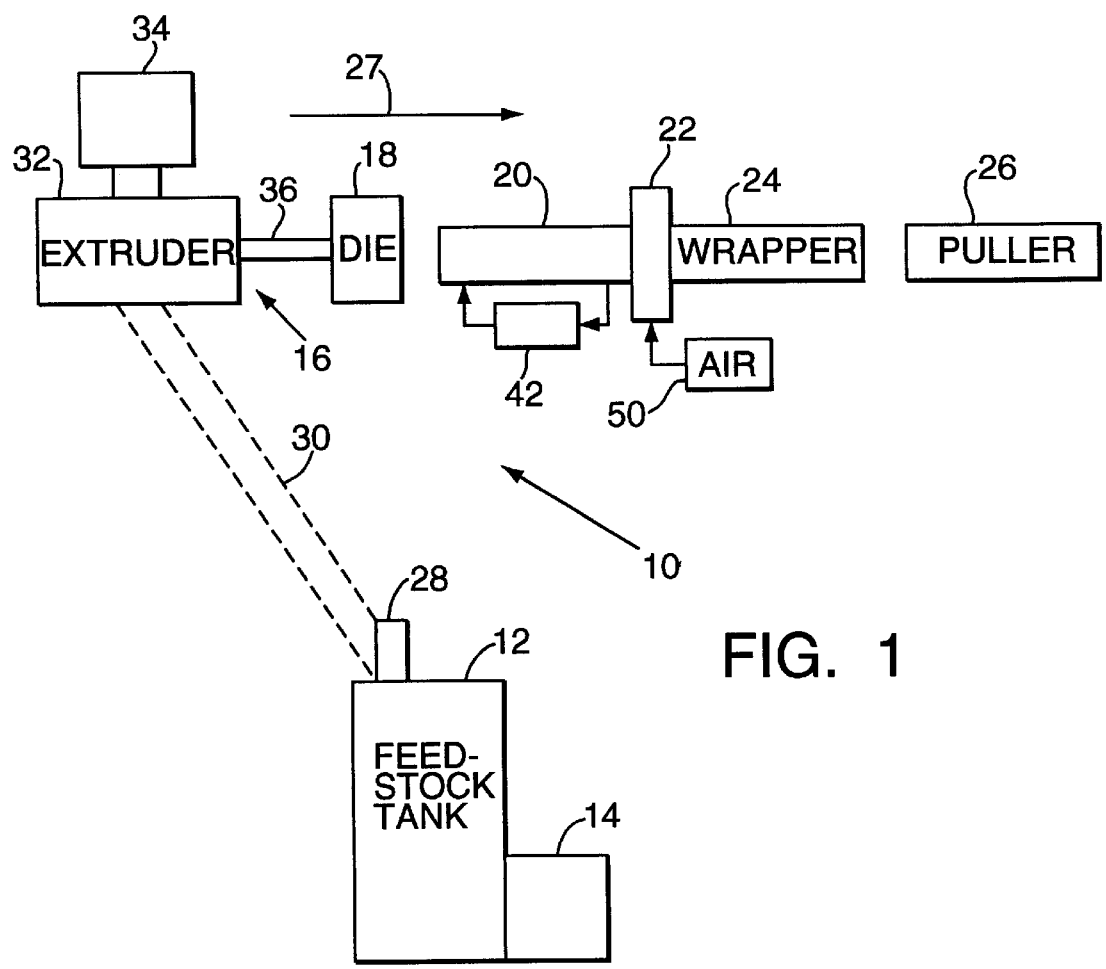
FIG. 1 is a schematic diagram of an apparatus for making a hot-pour crack sealer product in accordance with the present invention.

Turning now to FIG. 1, an apparatus for manufacturing a direct-fire crack sealer product in accordance with the present invention is indicated by the reference numeral 10. The apparatus 10 includes a feed stock tank 12 and a heating unit 14 for heating and melting the material in the tank 12. The apparatus also includes extrusion equipment 16 with a die 18 for extruding long strands of material, a coolant trough 20 and air knife 22 for cooling the extruded material, a wrapping station 24 for applying an anti-adherent to the extruded material, and a puller 26 for reducing the diameter of the extruded, wrapped material. The material progresses through the above equipment as indicated by the arrow 27.

The feed stock tank 12 includes a heating chamber, within which bulk crack sealer material is received. The material is preferably a hot-pour crack and joint sealer, such as an asphalt-based, hot pour and rubberized material, and is typically provided in large, e.g., 50 lb., blocks. One such thermo-plastic rubber material is marketed in block form under the trademark "LATEXITE" by the assignee of the present invention. While the heating chamber may be of virtually any capacity, the chamber is capable of holding about 30,000 lbs. of material, e.g., about 600 50 lb. blocks. It is also possible to provide the material in the chamber in a form other than blocks. The large chamber capacity enables additional material to be added without significantly affecting the temperature of the heated material already in the chamber.

The heating unit 14 is connected to the feedstock tank 12 in any one of a conventional number of manners. The heating unit 14 is capable of heating material in the chamber to a temperature high enough to substantially soften the material, and also of maintaining the material at such a temperature. In the case of the "LATEXITE" material described above, the material is heated to and maintained at a temperature of between 250°–300° F.

A pump 28 is positioned near the feedstock tank 12, and pumps the melted material from the chamber through a line 30 and into the extrusion equipment 16, which includes as many extruders 32 (only one shown in FIG. 1) as the number of different diameters of crack sealer material being made. Preferably, multiple extruders are employed to enable the production of each size of material independently of the other sizes, e.g., in the event that one extruder is taken off-line for repair or other purpose. In the illustrated embodiment, there are three different sizes being made, and accordingly there are three extruders 32, each of which has an associated die 18. Each die 18, in turn, has an opening that is sized to produce an extrusion having a predetermined diameter.

The material pumped into each extruder 32 is heated, and depending upon the temperature to which the material is heated, the material may not hold a shape when extruded. As needed, the material must be cooled to a temperature which is cool enough so that the material will hold a shape when extruded but hot enough so that the material is soft enough to be readily extruded. A cooling unit 34 is associated with each extruder 32, and cools the material to a temperature below the melting temperature. In the case of the "LATEXITE" thermo-plastic rubber material, the material is cooled to a temperature of about 120° F. The cooling unit 34 also cools an extrusion screw 36 and its associated die 18, each of which will be heated by the material being extruded. Each extruder 32 also has an associated heating unit (not shown) to pre-heat the extrusion screw and die prior to extruding any material, so as to prevent any material from cooling and setting in the extruder barrel or in the die.

Figure 2:
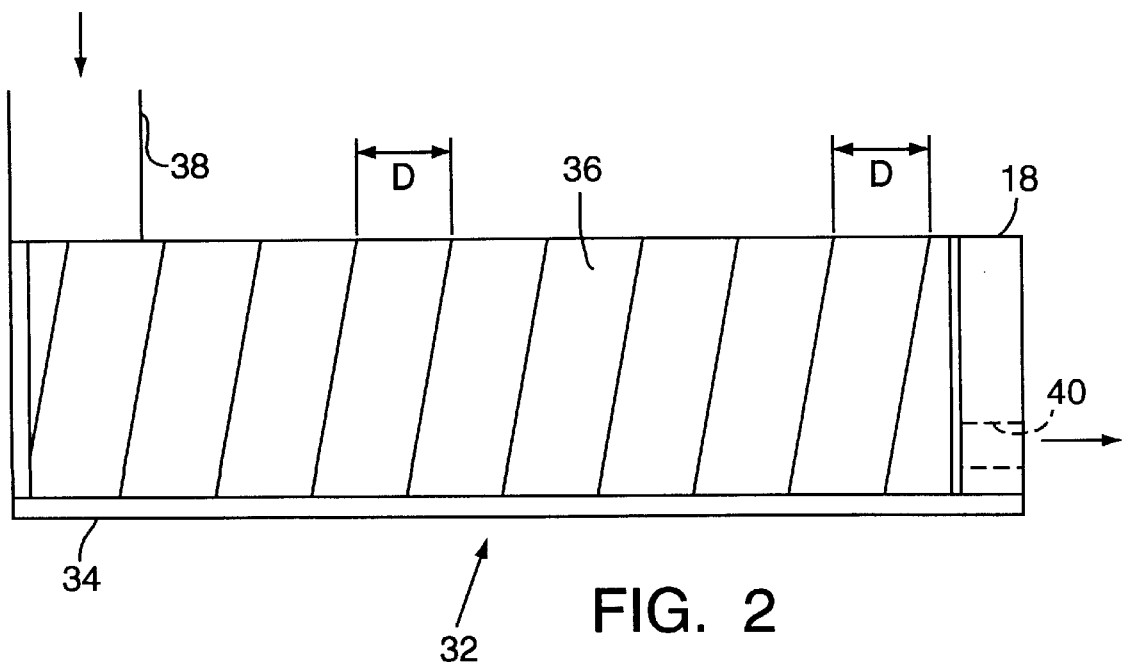
FIG. 2 is a schematic view of an extruder used in the apparatus of FIG. 1.

Referring now to FIG. 2, the melted material is pumped from the heating chamber 12 (FIG. 1) through a feed throat or inlet 38 of the extruder 32. As the material is extruded, there is little or no change in volume. Thus, the extrusion screw 36 shown in FIG. 2 differs from a conventional screw used with pelletized polymers in that the screw 36 has a constant depth of flight D. As noted above, the extruder 32 is cooled as needed in order to cool the melted material which is pumped from the heating chamber. The cooling unit 34 is coupled to the extruder and screw 36, and also to the die 18.

Figure 3:
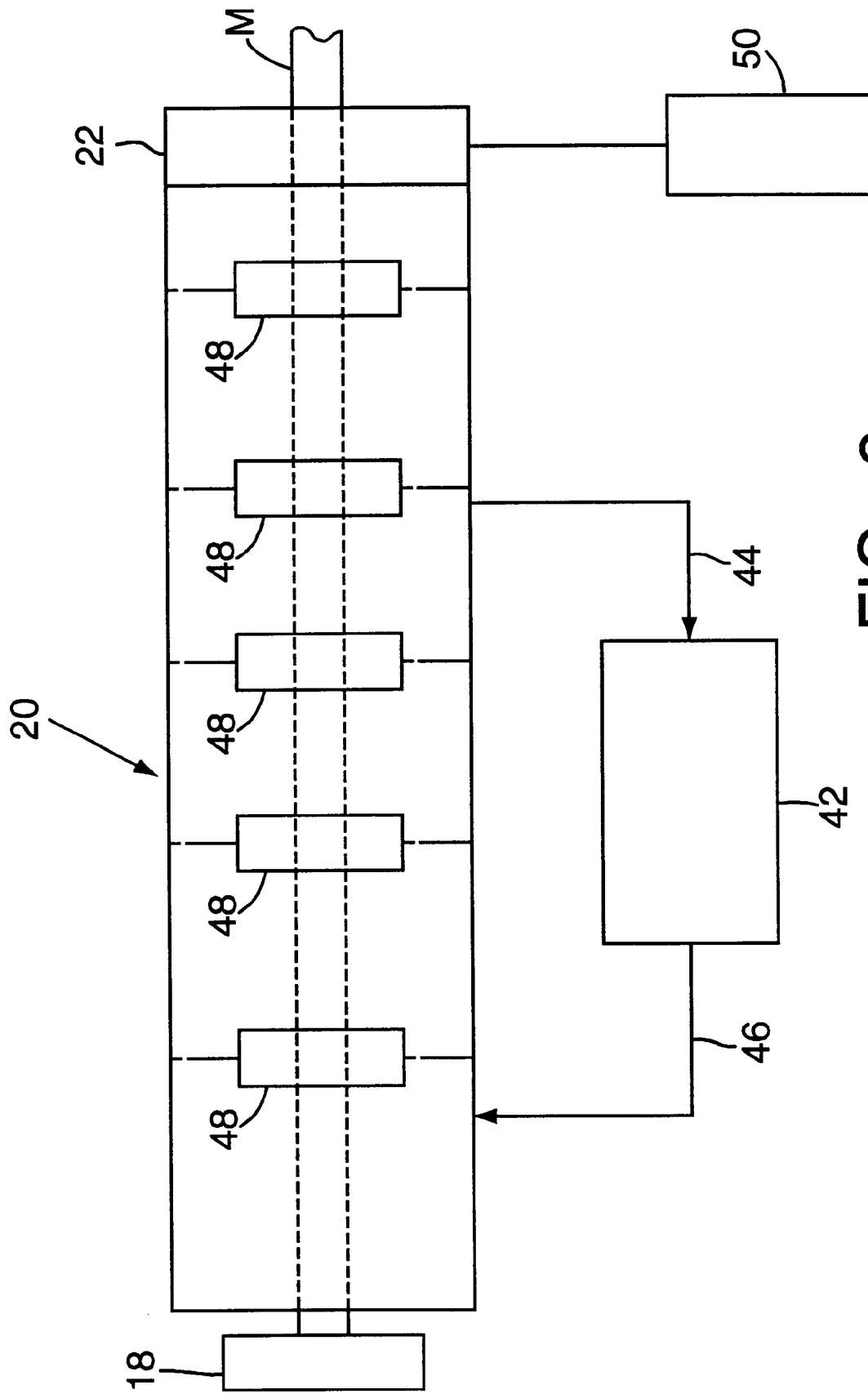
FIG. 3 is a schematic view of a coolant trough of the apparatus of FIG. 1, through which a strand of extruded material is passed, and an air knife for removing excess coolant from the material.

The cooled, but still softened, material exits the outlet 40 of the extruder 32 directly into the coolant trough 20, so that the extruded material M (indicated in dashed lines in FIG. 3) is further cooled. The trough is preferably fabricated from stainless steel, and holds a quantity of cooling liquid, such as water. Again, the extruded material is immersed in the water in the trough 20, and loses heat to the water. In order to maintain a relatively constant, cool water temperature, a chiller 42 is provided. Warmer water from the trough passes through an inlet 44, heat is removed from the water via the chiller, and cooler water is returned through the chiller outlet 46 into the trough 20. The length of the trough and use of a chiller are adjusted as desired to cool the extruded material to a desired degree.

In addition, support rollers 48 are provided near the bottom of the trough 20. The rollers support the extruded material as the material is passed through the water and prevent the material from touching the trough, thereby reducing the drag that would occur were the extruded material to contact the trough directly, and also reducing the possibility of extruded material breakage.

The air knife 22 is positioned at the end of the trough 20, and is coupled to a compressed air source 50. The air knife applies jets of air across the wet, extruded material M in order to remove and at least partially dry the extruded material.

Figure 4:
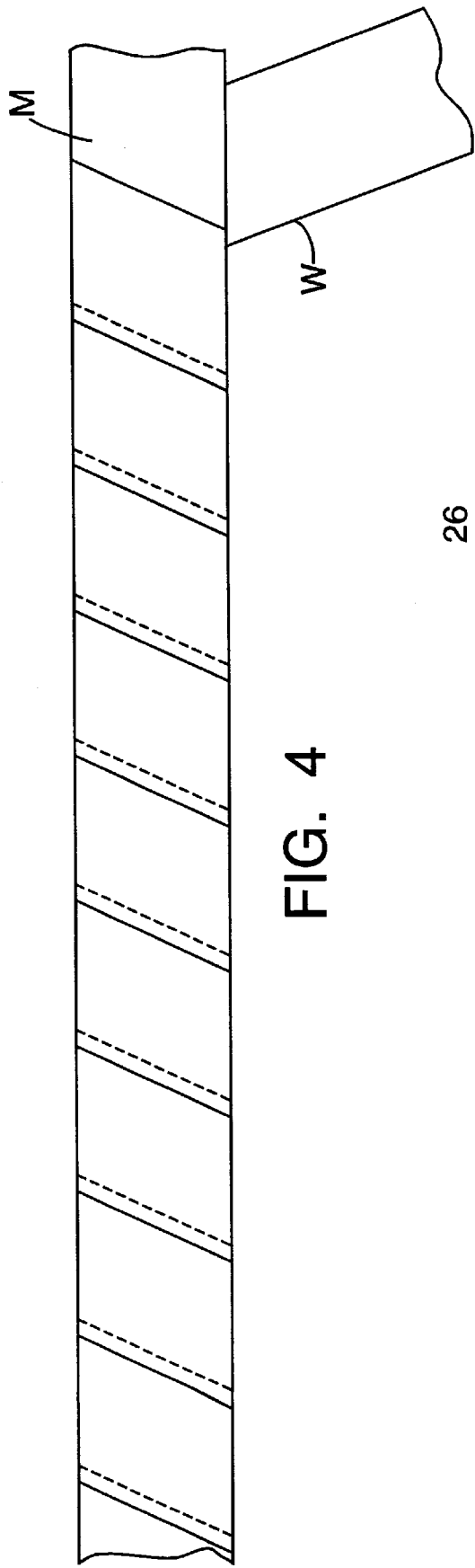
FIG. 4 illustrates a strand of extruded material wrapped with an anti-adherent material in accordance with the present invention.

The extruded material M, which has been further cooled and dried, then passes through the wrapping station 24, at which an anti-adherent material is applied. The anti-adherent material prevents the extruded material from sticking to itself, any packaging and the user of the product, and thus enables the extruded material to be readily handled, both for packaging and for subsequent installation. The stickiness of the material can become more evident during shipping, e.g., in hot railway boxcars or tractor-trailers, as the material can soften, deform or adhere to the packing and become useless. It is also important that the anti-adherent either vaporize during heating or otherwise not adversely affect the composition of the crack sealer material or its ability to bond to crack sidewalls during installation. While a variety of materials are suitable, such as powered talc, the preferred anti-adherent material is a thin film of polyethylene. The polyethylene wrapper W may be installed on the extruded material M in one of several ways, and preferably is spiral wrapped in an overlapping manner around the extruded material, as shown in FIG. 4.

Once the material is ejected from the extruder 16, the puller 26 provides the movement of the extruded material in the direction of arrow 27 through the trough 20, air knife 22 and wrapping station 24. Since it is important to provide a continuous strand of extruded material, the puller must grip and draw the extruded material through the trough without slip while also reducing the diameter of the extruded material, but not so hard as to deform or break the strand.

Figure 5:
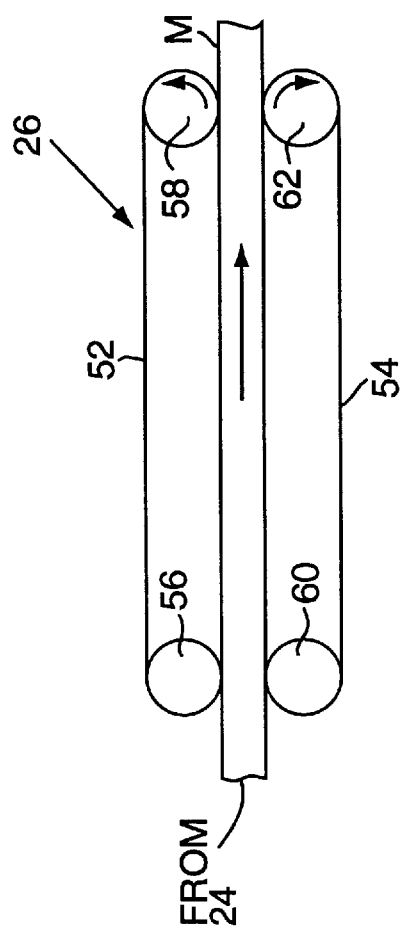
FIG. 5 illustrates a puller for reducing the diameter of the strand in accordance with the present invention.

As illustrated in FIG. 5, the puller 26 includes a pair of endless belts 52, 54, which extend around respective rollers 56, 58, 60, 62. The belts are about 3 inches wide, and about two feet long, although belts of other dimensions could also be use with satisfactory results. In order to cushion and grab but not deform the strand of extruded material, the belts are preferably fabricated from a closed-cell foam such as neoprene. The wrapped strand is then wound onto a spool or otherwise stored, to be subsequently packaged for resale.

Figure 6:
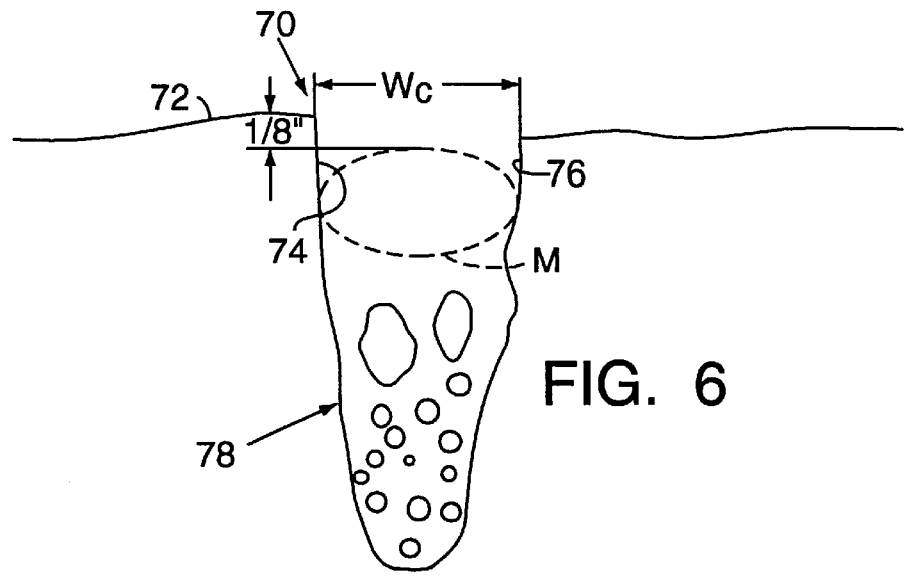
FIG. 6 is a sectional view of a crack to be repaired using the crack sealer and a repair method in accordance with the present invention.
Figure 7:
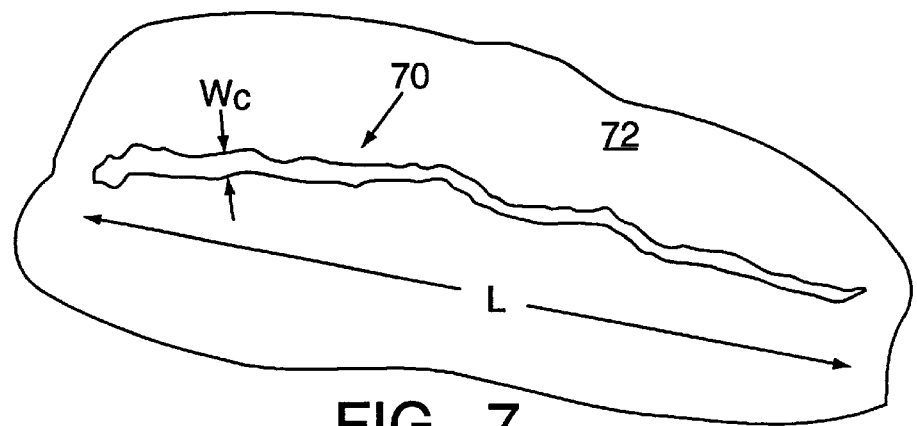
FIG. 7 is a perspective view of the crack of FIG. 6.
Figure 8:
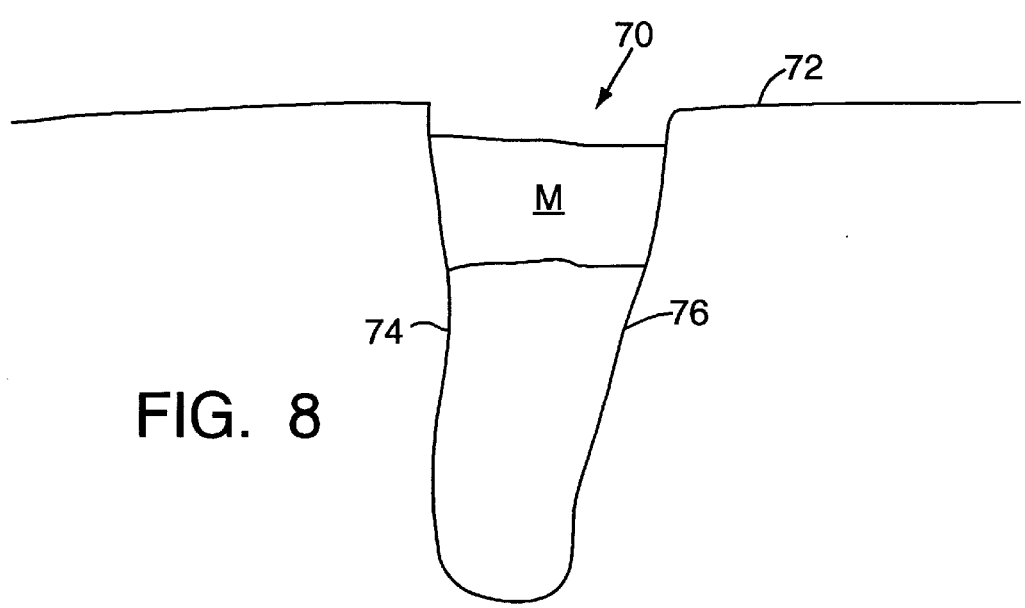
FIG. 8 is a sectional view of the crack of FIGS. 6 and 7 after being repaired in accordance with the present invention.

A crack to be sealed in accordance with the present invention is illustrated in FIGS. 6–8 by the reference numeral 70. The crack may occur in a layer of material 72 for one or more of the reasons described above. The crack 70 has side walls 74, 76, and is shown as being partially filled with loose debris 78. Initially, the crack is cleaned using any suitable instrument, such as a wire brush or the blade of a screwdriver to remove the loose debris 78, at least down to a desired depth, e.g., ½–¾ of an inch below the surface level. The area adjacent to the crack is then swept clean.

A crack sealer material M of a particular diameter is selected based upon the width Wc of the crack 72. A length L (FIG. 7) of material M is manually packed into the crack, and is positioned just below the surface 72, e.g., about ⅛ of an inch, as indicated by the dashed lines in FIG. 6.

The material M which has been packed into the crack 70 is then heated and melted using a heat source such as a handheld propane torch (not shown). The torch is passed over the crack sealer material to heat and liquefy the material. Once liquefied, the material flows into the tiny voids along the sidewalls 74, 76 of the crack. As the molten material cools, it flows into and bonds with the side walls 74, 76 to permanently repair the crack. Since the material M is rubberized and pliable, the material can expand and contract as the surface layer expands and contracts.

One advantage of the present invention is crack repairs may be made using an optimum crack sealer material, namely hot-pour, rubberized crack sealer, without the substantial capital investment required with prior hot-pour crack repair methods.

Another advantage of the present invention is that a hot-pour crack sealer may be applied by the homeowner or other "do-it-yourselfer" using inexpensive tools which most people already own, thereby eliminating the need to hire a contractor and resulting in substantial cost savings.

Still another advantage of the present advantage is that an anti-adherent cover is applied to the crack sealer material, thereby eliminating the mess associated with known crack sealer and filler materials.

Yet a further advantage is that the present invention uses only as much crack sealer as is needed to seal the existing cracks, so that no material is wasted.

While preferred embodiments have been shown and described, various modifications and substitutions may be made without departing from the spirit and scope of the invention. Accordingly, it is to be understood that the present invention has been described by way of example and not by limitation.

What is claimed is:

1. An elongated strip for repairing cracks in pavement made in accordance with the method comprising the steps of:

heating bulk direct-fire crack sealing material in a heating chamber to a temperature near the melting temperature of the material in order to soften the material;

extruding the softened material into a length of extruded material having a predetermined diameter and defining an exterior surface extending along its length; and applying an anti-adherent covering to extend about the exterior surface of the extruded material along its length for ease of handling and for direct application to cracks without removal of the anti-adherent covering.

2. The elongated strip made in accordance with the method defined in claim 1 further comprising the step of:

further cooling the extruded material prior to the step of applying the anti-adherent.

3. The elongated strip made in accordance with the method defined in claim 1 further comprising the step of:

reducing the predetermined diameter of the extruded material to a desired diameter.

4. The elongated strip made in accordance with the method defined in claim 1, wherein the step of reducing is performed by drawing the material along its length, thereby lengthening the material while reducing the diameter.

5. The elongated strip made in accordance with the method defined in claim 1, further comprising the step of:

removing the cooling medium from the further cooled, extruded material prior to the step of applying the anti-adherent.

6. The elongated strip made in accordance with the method defined in claim 1, wherein the anti-adherent is wrapped around the extruded material during the step of applying the anti-adherent.

7. The elongated strip made in accordance with the method defined in claim 1, wherein the anti-adherent is made from polypropylene.

8. The product made in accordance with the method defined in claim 1, further comprising the step of:

cutting the extruded material into predetermined lengths after the step of applying the anti-adherent and the step of reducing the diameter.

9. The elongated strip made in accordance with the method defined in claim 1 wherein the anti-adherent covering is made from polyethylene.

10. A crack sealing product for repairing cracks in driveways, the product comprising:

an elongated strip of crack sealer material defining an exterior surface extending along its length; and an anti-adherent covering extending about along the length of the exterior surface of the elongated strip for ease of handling and for direct application to cracks without removal of the anti-adherent covering.

11. The crack sealing product as defined in claim 10 wherein the anti-adherent covering is of a type which vaporizes upon application of heat during installation.

12. The crack sealing product as defined in claim 10, wherein the anti-adherent covering is of a type which dissolves upon application of heat during installation so as to permit the elongated strip to adhere to sides of cracks.

13. The crack sealing product as defined in claim 10 wherein the anti-adherent covering is made from polyethylene.

14. The crack sealing product as defined in claim 10 wherein the anti-adherent covering is made from polypropylene.

15. The crack sealing product as defined in claim 10 wherein the anti-adherent material is wrapped around the elongated strip of crack sealer material.

16. The crack sealing product as defined in claim 10 wherein the anti-adherent material is spirally wrapped in an overlapping manner along the length of the elongated strip of crack sealer material.

17. The crack sealing product as defined in claim 10, wherein the crack sealer material is a thermo-plastic rubber.

* * * * *